United States Patent [19]
Seifried et al.

[11] Patent Number: 4,568,616
[45] Date of Patent: Feb. 4, 1986

[54] POLYESTER COMPOSITION AND MOLDED ARTICLES, PREFERABLY A FILM, PRODUCED THEREFROM

[75] Inventors: Walter Seifried, Wiesbaden; Dieter Engel, Kelsterbach; Werner Denneler, Plochingen, all of Fed. Rep. of Germany

[73] Assignee: Hoechst Aktiengesellschaft, Frankfurt, Fed. Rep. of Germany

[21] Appl. No.: 600,258

[22] Filed: Apr. 13, 1984

[30] Foreign Application Priority Data

Apr. 16, 1983 [DE] Fed. Rep. of Germany ....... 3313923

[51] Int. Cl.$^4$ .......................... C08L 67/02; B32B 27/36
[52] U.S. Cl. .................................... 428/480; 428/910; 525/176
[58] Field of Search .................. 525/176, 64; 428/480, 428/910

[56] References Cited

U.S. PATENT DOCUMENTS

| | | | |
|---|---|---|---|
| 3,856,883 | 12/1974 | Dickie | 525/64 |
| 4,089,828 | 5/1978 | Vasishth | 526/318 |
| 4,104,261 | 8/1978 | Magosch | 525/176 |
| 4,125,700 | 11/1978 | Graham | 204/159.16 |
| 4,143,094 | 3/1979 | Burzin | 525/176 |
| 4,172,859 | 10/1979 | Epstein | 525/176 |
| 4,233,352 | 11/1980 | Ono et al. | 428/141 |
| 4,292,233 | 9/1981 | Binsack | 525/64 |
| 4,320,207 | 3/1982 | Watanabe | 525/176 |
| 4,396,742 | 8/1983 | Binsack | 525/64 |
| 4,417,026 | 11/1983 | Lindner | 525/64 |
| 4,446,276 | 5/1984 | Binsack | 525/64 |

FOREIGN PATENT DOCUMENTS

| | | |
|---|---|---|
| 0007042 | 1/1980 | European Pat. Off. ............. 526/66 |
| 80304317 | 6/1981 | European Pat. Off. . |
| 82304568 | 3/1983 | European Pat. Off. . |
| 83301291 | 9/1983 | European Pat. Off. . |
| 1195116 | 6/1970 | United Kingdom . |

OTHER PUBLICATIONS

M. Woods et al., "Monodisperse Latices: I. Emulsion Polymerization with Mixtures of Anionic and Nonionic Surfactants," 40 *Proceedings of the Paint Research Institute* 541 (Dec. 1968).

G. Lohr, "The Determination of Particle Size Distribution of Aqueous Dispersions in the Submicroscopic Range by Aerosol Spectroscopy," 43 *Organic Coatings and Polymer Division* 420 (1980).

*Primary Examiner*—John C. Bleutge
*Assistant Examiner*—Patricia Short
*Attorney, Agent, or Firm*—James C. Lydon

[57] ABSTRACT

This invention pertains to a polyester composition containing finely divided polymer particles in a substantially homodisperse distribution. The polymer particles are prepared in an emulsion-polymerization process and are crosslinked.

The polymer particles exhibit an extremely narrow grain-size distribution and are incorporated into the polyester during the synthesis thereof.

The invention also relates to films, particularly stretched films, which are produced from the polyester composition and which can also be used as base films for the production of composite films.

It is additionally also possible to produce filaments and fibers from the composition according to the invention or with the addition of this composition to other polymers.

The films are preferably used as bases for magnetic recording elements or for capacitors, and fiber or filaments are employed in the production of tire cord.

17 Claims, 9 Drawing Figures

POLYESTER COMPOSITION AND MOLDED ARTICLES, PREFERABLY A FILM, PRODUCED THEREFROM

BACKGROUND OF THE INVENTION

1. Field of the Invention

The present invention relates to a polyester composition containing, in a substantially homodisperse distribution, finely divided crosslinked polymer particles which have been prepared in an emulsion-polymerization process and exhibit a narrow grain-size distribution. The polymer particles are incorporated into the polyester during the synthesis thereof.

The invention also relates to molded articles comprising the above-mentioned polyester composition and preferably being in the form of a stretched film, particularly a biaxially stretched film, which may even form part of a multilayer film.

The invention furthermore relates to fibers or filaments formed from the polyester composition according to the invention or comprising an addition of this composition to other polymers.

Moreover, the invention pertains to the use of the film, particularly as a support material for magnetic recording elements or as a capacitor film, and also to the use of the fibers or filaments, preferably in the production of tire cord.

Due to their outstanding properties, polyesters, in particular polyethylene terephthalate or polyester copolymers, which are especially in the form of oriented films, preferably biaxially oriented films, are used in many technical fields, for example, as a dielectric in capacitors, as a support material for video, audio and computer tapes, as stamping foils and the like.

For the various fields of application, polyester films should possess a number of specific properties, and these properties must either be systematically adjusted in the production process or must be pre-formed already in the raw material. Above all, a systematic adjustment of surface properties, particularly of the roughness structure of the surface and of the slip and abrasion behaviors which are connected therewith, must be taken into account, in view of the high processing speeds which are presently employed and in view of the permanent stresses occurring in use.

If the films are intended for use, for example, as supports for magnetic recording elements in audio, video and computer techniques, they must have a uniform and good slip behavior and a high abrasion resistance and, in particular, they must meet especially high requirements in respect of uniformity of surface structure. In particular, relatively large particles should not be present on the film surface, since these will form undesirable elevations, for example, upon coating with a magnetizable layer. When the film is, for example, used as an information carrier, these elevations result in a loss of information and thus limit or affect the usability of the film. Similarly, indesirable elevations produced by coarse particles give rise to difficulties in the metallization of capacitor films. For this purpose, good surface properties are required, which are diminished to a considerable extent by nonuniformity of the pigment.

High requirements regarding uniformity of surface must also be met, when polyester films are used as stamping foils. In other technical applications good transparency of the films is required in the first place.

2. Description of the Prior Art

It has been disclosed in the prior art to overcome or at least alleviate the disadvantages by adding pigments of a very broad grain-size distribution to polymers, in such a way that, for example, the inorganic particles are classified or catalyst precipitation is influenced by the choice of catalysts and by the choice of catalysts and by the choice of the type and quantity of the phosphorus stabilizers which are added in the polyester production.

A detailed summary of the prior art and of the methods employed to overcome the disadvantages in the structuring of film surfaces, by catalyst precipitation or by the addition or inorganic particles, is given in U.S. Pat. No. 4,320,207. U.S. Pat. No. 4,320,207 has proposed to incorporate crosslinked particles into polyester films, in order to improve, in particular, the affinity between the added particles and the polymer matrix, the crosslinked particles being formed by pulverizing a crosslinked polymer having a specific surface area of at least 1 $m^2/g$ and a pore volume of at least 0.1 ml/g. The described improvements which are achievable with these particles, due to an improved affinity for the polyester—either by filling pre-formed cavities with matrix polymer or by true covalent bond of the particles with the polymer matrix—require great technical expenditure in the preparation of the particles. As disclosed, a porous crosslinked copolymer must be polymerized in an emulsion-polymerization process with the addition of linear polymers and solvents to produce the polymer particles which are described as additives for film-forming polyesters.

Moreover, the organic solvent added and the straight-chain polymeric compound must be extracted to obtain a good grindability and to prevent disturbing foams. It is also necessary to pre-grind the polymer to a grain size of approximately 10 $\mu$m in a jet mill. The desired grain-size distribution must, in addition, be adjusted by at least one grinding operation in a pearl mill.

It is still a fundamental disadvantage of this prior art process that—in addition to the great techncial expenditure—the kind of adjusting the grain size of the particles inevitably results in a particular grain-size distribution, involving the problem of oversize grain, i.e. particles which have sizes exceeding the average size.

It is therefore an object of the present invention to provide a polyester raw material containing, in a substantially homodisperse distribution, finely divided crosslinked polymer particles which show a narrow grain-size distribution in the polyester material and possess a good affinity for the raw material; which result in a good distribution upon incorporation into the raw material; and which give a structured surface without any undesirable excessive structures (in the positive and/or negative region), agglomerates or coarse surface elevations, when they are used for the production of molded articles, particularly films which are preferably in a stretched form.

SUMMARY OF THE INVENTION

The object of the invention is achieved by a composition comprising a polyester polymer modified with from 0.005 to 5.0 percent by weight, based upon the total weight of said composition, of crosslinked polymer particles covalently bonded to and substantially homogeneously distributed throughout said polyester, said particles having a grain size distribution of from 0.02 to 2.0 $\mu$m, wherein the quotient of the weight average particle diameter and the number average particle diameter is less than 1.1. The polyester composition of the present invention may be fabricated into heat-set and/or oriented films useful in magnetic recording tape and capacitor film applications. Fibers formed from the polyester composition may be useful as a tire cord.

DETAILED DESCRIPTION OF THE INVENTION

Figure 1:
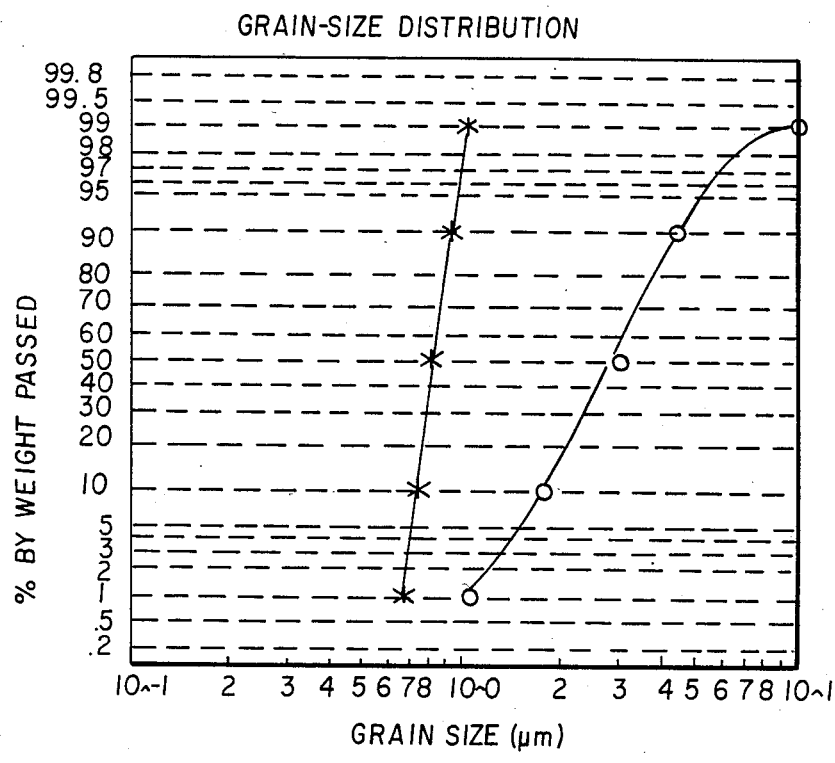
FIG. 1 is a graph of particle grain size distribution.

Surprisingly, it has been found that crosslinked polymer particles which are appropriate for incorporation into polyester compositions can be produced in a suitable size distribution by an emulsion-polymerization process. It has also been found that the particles used according to the present invention are attained in the emulsion polymerization in a nearly monodisperse distribution, practically free of oversize grain. The emulsions obtained in the preparation process can be added directly in the polyester synthesis, without the need for an expensive grinding or classifying operation, and they result in an excellent distribution in the polymer.

It has furthermore appeared that the molded articles, for example films which preferably are in a stretched form, particularly in a biaxially stretched form, and for the production of which particles according to the invention have been used, have very uniformly structured surfaces showing unform elevations and being free of disturbing elevations which are greater than those determinable by the uniform grain size of the added particles.

Moreover, it has been found that, due to the spherical shape of the crosslinked particles, which is determined by the preparation process, the elevations protruding from the surface of the preferably stretched films, in which these particles have been employed, are also substantially spherically shaped. As a result, an exactly defined surface roughness and an excellent abrasion behavior are obtained.

The crosslinked, covalently incorporated particles make it possible—by the choice of particle concentration in the polyester and by the choice of grain size of the added particles—to structure a surface of a molded article, preferably an oriented film, in such a way that the ratio between the contact area formed by the elevations, e.g. when a film is contacted by rolls, and the area formed by the free space between the elevations can, in any case, be accurately adjusted and that also the distance between the level of the contact area and the level of the free space is adjustable within close limits.

It is, for example, possible to achieve a very high density of peaks at an extremely narrow distribution of heights of peaks, and it is also possible to produce a desired distribution of particle sizes by mixing particles of different sizes, however, in that case, the below-indicated conditions must be complied with.

According to the invention, the polyester composition contains from 0.005 to 5.0 percent by weight of polymeric particles, which have a grain-size distribution in the range from 0.02 to 2.0 μm, the quotient of the weight average particle diameter ($D_w$) and the number average diameter ($D_n$) less than 1.1, particularly preferably <1.05. For the determination of $D_w$ and $D_n$ see U. E. Woods, J. S. Dodge, I. M. Krieger, P. Pierce in "Journal of Paint Technology", Vol. 40, No. 527, 1968, page 545, the disclosure of which is hereby incorporated by reference.

Polyester compositions are to be understood as including polymers which are preferably substantially built up of ethylene terephthalate units and/or preferably up to 30 mole percent of comonomer units, with a possible variation in the glycol component and/or the acid component of the comonomer units. The polyesters can be prepared according to the transesterification process, using conventional catalysts such as, for example, zinc, calcium, lithium and manganese salts and they can also be prepared according to the direct esterification process.

Processes which are known per se and which need not be described in detail, can be employed for the production of polyester films from the above-described raw materials or from a combination of the above polyester polymers with further polymers or additives. The films may be in the form of single layer and also multi-layer films which are optionally coextruded and have identically structured surfaces or differently structured surfaces, in which one surface is pigmented and the other surface does not contain any pigment.

Particularly in a multi-stage stretching process involving high stretching ratios in one preferred direction or both in the longitudinal (machine) and transverse directions, for example, in the production of films which meet very high mechanical requirements, the advantages of the covalently incorporated particles according to the invention become especially effective. It is also possible to employ stretching processes which include the following stretching sequences: longitudinal-transverse-longitudinal, simultaneous (longitudinal/transverse) and multiple stretching in one or both directions.

In the present invention, the nearly monodisperse, crosslinked polymer particles corresponding to the above-indicated data, which have been prepared in an emulsion-polymerization reaction and carry incorporated reactive groups, are particularly advantageously introduced, as early as possible, into the polyester synthesis, for example, advantageously at the beginning of the transesterification reaction or, in the case of direct esterification, at the beginning of the esterification reaction.

It is particular advantage of the present invention that the crosslinked polymer particles which are present in the dispersion obtained in the emulsion polymerization can directly be introduced into the polymer synthesis, without the need for expensive size-reduction, classification, filtration and purification processes. For this purpose, ethylene glycol is, for example, added to the aqueous dispersion from the polymerization reaction or is added at the beginning or during the polymer-production process.

The crosslinked particles can be prepared in an emulsion-polymerization process in such a way that a crosslinked or non-crosslinked latex is initially present or is produced in situ, and the primary particles are increased to the desired particle size in one or several stages, by causing to swell and polymerizing a further monomer or a monomer mixture.

The emulsion polymerization can be conducted with or without the addition of an emulsifying agent. The conventionally used emulsifiers can be employed for emulsifying and stabilizing the latex, for example, anionic emulsifiers, such as alkyl sulfates, alkylaryl sulfates, alkylaryl sulfonates, alkali metal salts and/or ammonium salts of alkyl or alkylarylpolyglcolether sulfonates, as well as non-ionic emulsifiers, such as oxethylated fatty alcohols and alkyl and alkylaryl phenols.

Preferably, the amount of emulsifier is kept as low as possible. Particularly preferred production processes are those which can be carried out without emulsifiers and protective colloids.

Examples of comonomers which can optionally be used in the polyester include unsaturated non-ionic monomers, such as the ester of acrylic and methacrylic acids, for example, methyl methacrylate, butyl acrylate, 2-ethylhexyl acrylate, ethyl acrylate, preferably methyl methacrylate and butyl acrylate, the diesters of unsaturated dicarboxylic acids, such as maleic acid dialkyl ester, unsaturated vinyl compounds, such as styrene and vinyl toluene, unsaturated nitriles, such acrylonitrile and methacrylonitrile, functional monomers, such as unsaturated carboxylic acids, for example, methacrylic acid, acrylic acid, maleic acid, crotonic acid, itaconic acid, monomers containing hydroxyl groups, such as hydroxyethyl methacrylate, hydroxyethyl acrylate, hydroxypropyl methacrylate, hydroxypropyl acrylate, n-methylol methacrylamide, monomers containing epoxy groups, for example, glycidyl methacrylate and allylglycidyl ether, unsaturated sulfonic acids, such as ethane sulfonate or acrylamidopropane sulfonic acid.

The crosslinked particles are obtained by polymerizing ethylenically unsaturated monomers in an aqueous system in the absence of emulsifiers and protective colloids, using free-radical initiators which are partly or completely soluble in water, it being necessary, at least at the start of polymerization, for a polyethylenically unsaturated compound to be present in the polymerization mixture in an amount of more than 0.01% by weight, based on the total amount of monomer. It is possible to obtain thereby polymer dispersions which are free from emulsifiers and protective colloids and have an average particle diameter between 0.05 and 2.0 $\mu$m and and a particle size distribution $D_w/D_n < 1.05$.

The emulsion polymers can be obtained from the aqueous polymer dispersions in a dry powder form free from emulsifiers and protective colloids by removal of water. The removal of water can be effected, for example, by spray drying, freeze-drying or thin-film evaporation. Spray drying is preferred.

Corresponding non-aqueous polymer dispersions which are free from emulsifiers and protective colloids can be obtained either by carrying out the polymerization in a homogeneous mixture of water and a water-miscible non-aqueous phase as the dispersing medium, or by mixing the water-miscible, non-aqueous phase with the aqueous dispersion when polymerization is complete, and in either case subsequently removing the water more or less completely from the mixture. This can be effected, for example, by distillation. Vacuum distillation is particularly preferred.

Crosslinked particles free from emulsifiers and protective colloids may be prepared by the free-radical initiated emulsion polymerization of ethylenically unsaturated, copolymerizable monomers, which comprises first subjecting to preliminary polymerization, in the absence of emulsifiers and protective colloids and using one or more water-soluble, free-radical forming initiators in an aqueous emulsion, an amount or partial amount of the polyethylenically unsaturated, copolymerizable monomer of at least 0.01% by weight, preferably 0.01 to 20% by weight, particularly preferentially 0.02 to 10% by weight and especially 0.1 to 5% by weight, based on the total amount of monomers, if appropriate on its own or, preferably, together with a partial amount of the monoethylenically unsaturated monomers of preferably 0.5 to 40% by weight, particularly preferentially 1 to 30% by weight and especially 1.5 to 15% by weight, based on the total quantity of monomers, and then metering in the residual amount of the monoethylenically unsaturated monomer and, if appropriate, the residual amount of the polyethlenically unsaturated monomer and, if appropriate, the residual amount of initiator, completing the polymerization of the mixture and, if appropriate, subsequently isolating the polymers from the resulting dispersion.

The content of disperse, polymeric solids in the resulting polymer dispersions is preferably 20 to 55% by weight, especially 25 to 45% by weight, based on the dispersion.

The process can be carried out discontinuously or continuously.

The particles are preferably in the form of a dispersion or a dry powder. They can, however, also constitute shaped articles, especially film.

Examples of crosslinking components which may be used for the particles which are to be incorporated are polyethylenically unsaturated compounds, such as diallyl phthalate, divinyl benzene, butanediol dimethacrylate, ethanediol dimethacrylate, hexanediol dimethacrylate, ethanediol diacrylate, butanediol diacrylate, hexanediol diacrylate, pentaerythritol triacrylate, trimethylol propane triacrylate, tetraethylene glycol diacrylate, tripropylene glycol diacrylate and trimethylol propane trimethacrylate.

The use of the polyethylenically unsaturated compounds discussed above surprisingly makes it possible, inter alia, to achieve high solids contents during the emulsion copolymerization, and, at the same time, to achieve, in the finished dispersion, a very good stability against coagulation of the batch. A content of at least 0.01% by weight, based on the total quantity of monomers, of one of the crosslinking components discussed above in the quantity of monomer initially taken is required for this purpose, at least during the starting phase of the polymerization. The amount of polyethylenically unsaturated monomers, based on the total amount of monomers, should, in general, preferably be between 0.01 and 20% by weight, particularly preferentially 0.02–10% by weight and especially 0.02–5% by weight.

Hydroxyethyl methacrylate, acrylic acid and methacrylic acid are particularly suitable examples of the components which carry functional groups and which are incorporated by polymerization into the particles, in order to form covalent bonds between the polyester matrix and the crosslinked particles, preferably in the polyester synthesis.

The degree of crosslinking of the particles can be varied within wide limits, by the composition and particularly by the amount of the crosslinking component. It is thus possible to produce particles which have a soft, rubber elastic consistency and also particles which have a hard, brittle, highly crosslinked structure.

Examples of preferred monomer combinations are acrylate or methacrylate monomers as monoolefinically unsaturated compounds, and divinylbenzene as a polyunsaturated compound. Examples of particularly preferred combinations are those comprising methyl methacrylate, butyl acrylate and divinylbenzene; or styrene, butyl acrylate and divinylbenzene; or styrene, methyl methacrylate and divinylbenzene; or methyl methacrylate, butyl acrylate, divinylbenzene, methacrylic acid and/or acrylic acid; or styrene and divinylbenzene; or styrene, acrylonitrile and divinylbenzene; or vinyl acetate and butanediol dimethacrylate; or methyl methacrylate, butyl acrylate and butanediol dimethacrylate; or acrylonitrile and divinylbenzene; or vinyl chloride and divinylbenzene.

The composition of the monomers should preferably be selected so that the content of hydrophilic monomers, such as, for example, acrylic acid, methacrylic acid, acrylonitrile, hydroxyethyl methacrylate, glycidyl methacrylate, maleic acid, maleic acid half-ester and the like is not more than 25% by weight, preferably <15% by weight, based on the total amount of monomers. The polymerization liquor is stirred at the stirring speeds customary for emulsion polymerizations, for example at 10–200, preferably 3–100, r.p.m.

Dispersions of organic polymer particles can, for example, preferably be prepared in the following manner: 0.01 to 10% by weight of a water-soluble, radical-forming initiator, preferably 0.02–5% by weight and particularly preferentially 0.05–3.0% by weight, based on the total amount of monomers in the batch, is added to an aqueous system containing one or more types of ethylenically unsaturated monomers, of which 0.1–100% by weight, preferably 0.5–60% by weight and particularly preferentially 1–40% by weight, based on the amount of monomers initially taken, must be polyethylenically unsaturated monomers, and the polymerization is started, for example by thermolytic decomposition of the free-radical initiator. Instead of initially taking the total amount of the initiator, it is also possible initially to take, in the aqueous liquor, only a fraction of the initiator, preferably 1–90% by weight, particularly preferentially 5–70% by weight and especially 10–60% by weight, based on the total amount of the initiator, and to meter in the residual amount subsequently as an aqueous solution together with the still outstanding amount of monomers.

The proportion of monomers in the polymerization mixture initially taken, at the start of the polymerization reaction in this mixture which is designated as preliminary polymerization, is preferably 0.01–30% by weight, particularly preferentially 0.1–25% by weight and especially 1–20% by weight, based on the total amount, initially introduced, of aqueous phase and non-aqueous monomer phase.

The duration of the preliminary polymerization is between 0.1 minute and 3 hours, preferably 0.5 minute to 2 hours and particularly preferentially 1 minute to 1 hour. The polymerization temperature is usually within a temperature range at which the initiator or the initiator system has a half-life time of decomposition between 20 minutes and 15 hours. After the completion of the preliminary polymerization, the amounts still outstanding of the monomer(s) and, if appropriate, the residual initiator are metered into the polyerization batch. The rate of metering in the monomer(s) and, if appropriate, the residual initiator should be adjusted to match the decomposition rate of the initiator or the initiator system in such a way that monomer does not float or settle out during the polymerization.

The emulsion polymerizations according to the invention are preferably carried out within an acid pH range of less than pH 7, preferably at pH 1 to 5.

The molecular weight of the polymers can be reduced in a known manner by the use of molecular weight regulators. Mercaptans, halogen-containing compounds and other radical-transferring substances are preferably used for this purpose. Butyl mercaptan, octyl mercaptan, dodecyl mercaptan, tetrakismercaptoacetylpentaerythritol, chloroform, carbon tetrachloride, trichloroethylene, trichlorobromomethane, bromoform and toluene are particularly preferred. Water-soluble peroxides, azo compounds or redox systems are preferably employed as radical-forming initiators. Examples of particularly preferred systems are sodium, potassium or ammonium peroxydisulfate or sodium, potassium or ammonium peroxydisulfate redox systems containing sulfides, sulfites or other reducing agents. Radical-forming initiators which are readily and completely soluble in water are preferred. The amount of the radical-forming initiator is preferably 0.01 to 10% by weight, particularly preferentially 0.02–5% by weight and especially 0.05–3.0% by weight, based on the total amount of monomers.

The particle size of the polymer particles can, inter alia, be influenced by the nature of the monomers used and their solubility behavior in water, and also by the nature and amount of the water-soluble, radical-forming initiator used or by the mode in which it is metered in, and also by the nature and the amount used of the polyethylenically unsaturated comonomers which result in polymeric crosslinking reactions, and also the nature and amount of the monoethylencially unsaturated compounds which may be copolymerized with these comonomers in the preliminary polymerization and, in some cases, also in the main polymerization.

In order to obtain non-aqueous dispersions according to the invention which are free from emulsifiers and protective colloids, either the polymerization described above is carried out in a mixture of water and an inert, non-aqueous organic compound, or, after polymerization has been carried out in an aqueous phase, an adequate quantity of a non-aqueous organic compound or a mixture of such compounds is added and the water is removed. These water-soluble organic compounds are preferably organic compounds containing OH groups or mixtures of such compounds. Glycolic compounds or mixtures thereof with water-miscible organic compounds, or in some cases also with water-immiscible further organic compounds, are very particularly preferred. Thus dispersing media composed of ethylene glycol or of mixtures containing ethyene glycol are very particularly preferred for the use of the polymer dispersions for pigmenting, for example, polyester compositions which can be used, for example, for the production of films, fibers or filaments.

The water-miscible, non-aqueous dispersing medium or the water-miscible, non-aqueous, liquid phase preferably contains inert, water-soluble organic compounds which contain hydroxyl groups and in which the OH groups can be completely or partly substituted, preferably etherified or esterified. Compounds containing unsubstituted OH groups are preferred. Polyhydric alcohols, in particular dihydric alcohols, such as glycols or polyglycols, and also polyglycol ethers in which the free hydroxyl groups can in some cases be substituted, are particularly preferred.

As inert, non-aqueous constituents, the dispersing medium can contain, for example, the following: monoalcohols, such as methanol, ethanol, isopropanol, butanol, amyl alcohols, iso-$C_{13}$ alcohol, lauryl alcohol, oleyl alcohol or butyldiglycol, monoesters or diesters of glycol or polyglycols with lower carboxylic acids, ethylene glycol, propylene glycol, glycerol, glycerol esters or partial esters, glycerol ethers, butylene glycol, phenol or alkylphenols. In removing the water of the dispersion by distillation it is preferable to use non-aqueous constituents having a boiling point higher than the boiling point of water. Ethylene glycol is particularly preferred.

Water is preferably expelled from mixtures containing ethylene glycol by distillation under normal pressure or in vacuo. The use of entraining agents or ternary mixtures can be particularly advantageous when removing water by distillation. The water content remaining in the resulting dispersion depends on the end use of the dispersion, for example on the water-sensitivity of the system which is to be pigmented with the polymer particles. However, as the water content rises, both the viscosity and the density of the resulting dispersion can fall which in both cases promotes the tendency to settle out and thus can have an adverse effect on the stability to storage.

The water content aimed at in the "non-aqueous" polymer dispersion is, therefore, preferably less than 20% by weight, particularly preferentially less than 10% by weight and very particularly preferentially less than 5% by weight, based on the dispersion.

It is an advantage of the present invention that the crosslinked particles are not soluble or fusible during the polymer synthesis and retain their original volume, even when the polyester is subjected to repeated melting operations in the production of molded articles, in particular in the production of films, or in the reworking of scrap.

If crosslinking is sufficient, the spherical shape of the particles, which has substantially been obtained in the preparation process is generally maintained and, as a result, the molded articles, preferably films, also have spherical elevations on their surfaces, particularly in the case of balanced stretching. With the aid of less crosslinked, i.e. ductile particles, it is, however, also possible to produce a surface with flattened elevations.

The advantages of the raw materials according to the present invention and of the molded articles, preferably films, produced therefrom reside in the fact that it is possible to obtain, in a simple manner, highly uniform surface structures without disturbing, relatively large elevations which might cause difficulties in the further processing and/or use.

A good abrasion resistance of molded articles is especially achieved by the covalent incorporation of the structuring particles. Due to the excellent, nearly homodisperse distribution of the crosslinked particles in the polyester, very regularly structured surfaces can be attained at high concentrations of the added particles. The dense packing and uniform height of the elevations result in a honeycombe-type structure, in which the depressions existing between the elevations enclose small air cushions and thus produce a favorable slip behavior, when the molded articles, preferably films, slide at high speed.

The high quality films which are, for example, produced according to the present invention can thus be employed in many technical fields. They are, for example, particularly suitable for use as support materials to which metal is applied by vapor-deposition or which are provided with thin coatings and which are used in video, audio and computer techniques, or as capacitor films, stamping foils and separating films.

The Figures which accompany the specification clearly illustrate the advantage of the present invention over the prior art.

EXAMPLES

The Examples which follow illustrate the practice and advantage of the present invention in comparison to the prior art. As Examples they are illustrative only, and do not limit the scope of the invention in any manner Measurements were made as follows:
Grain-size distribution:
 1. Using a Coulter Counter, Model IIA, manufacturer Coulter Electronics,
 2. by means of an aerosol-spectrometer for extremely finely divided particles.

In each case, the distribution of mass=distribution of volume was recorded, taking the spherical shape as a basis.

$d_{50}$=central value of grain-size distribution
$GS_1$=grain size determined for 1% residue or 99% passed, respectively
$GS_{10}$=grain size determined for 10% residue
$GS_{10}/GS_{90}$=narrowness of the curve of grain-size distribution.

Surface roughness of the films:
 1. By Gould measurements,
 2. using a Perthometer for measuring the $R_z$ value (average peak-to-valley roughness, determined as the mean value of the individual peak-to-valley roughnesses of five mutually adjoining individual measurement lengths, cf. DIN 4768),
 $R_t$ value (maximum peak-to-valley roughness between the highest and lowest points of the roughness profile).

By an interference method it is possible to control in a simple manner, whether coarse elevations are present.
Surface structure of the films:
 Photographs taken by transmitted light,
 Microphotographs taken with the aid of a scanning electron microscope.

FIG. 1 shows the extremely narrow grain-size distribution of the polymer particles used according to the present invention, in comparison to ground particles according to the state of the art.

Figure 2:
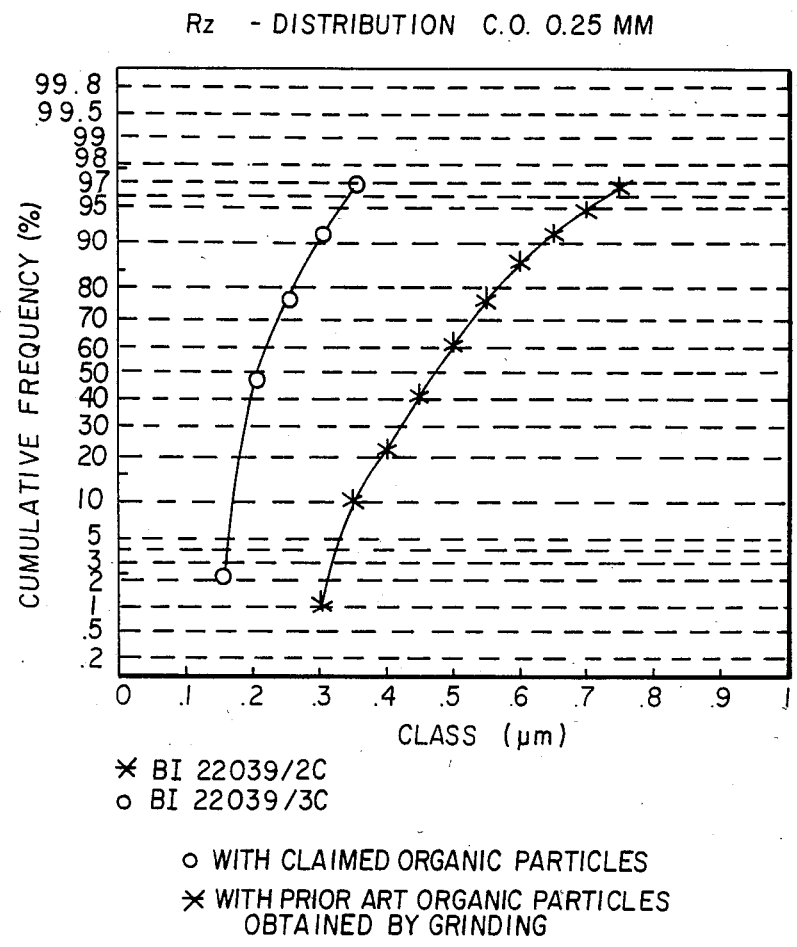
FIG. 2 is a graph of surface roughness in biaxially oriented polyester film surfaces.
Figure 3:
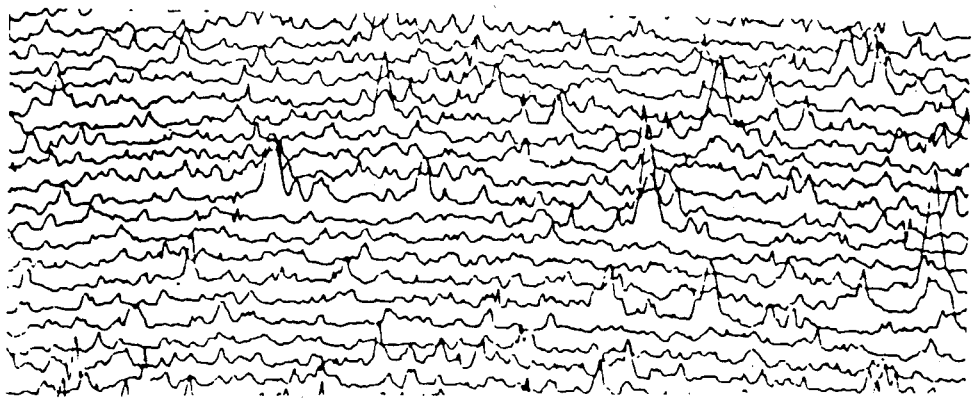
FIG. 3 is a diagram of the surface roughness of a biaxially oriented polyester film surface of the prior art.
Figure 4:
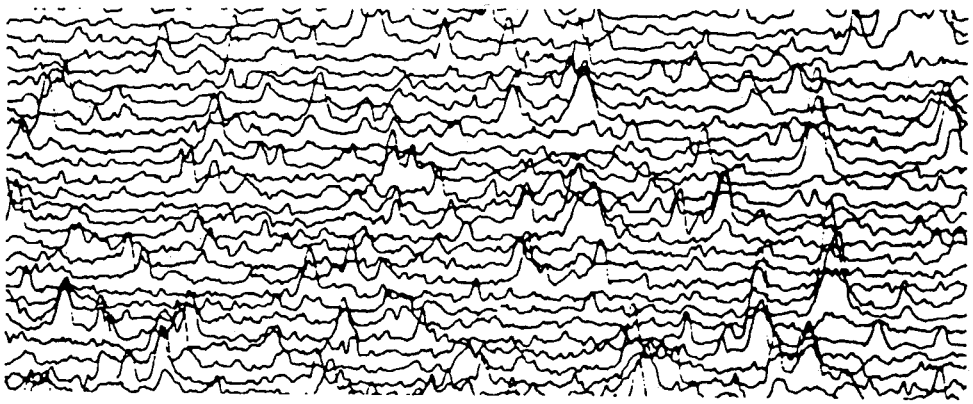
FIG. 4 is a diagram of the surface roughness of another biaxially oriented polyester film surface of the prior art.
Figure 5:
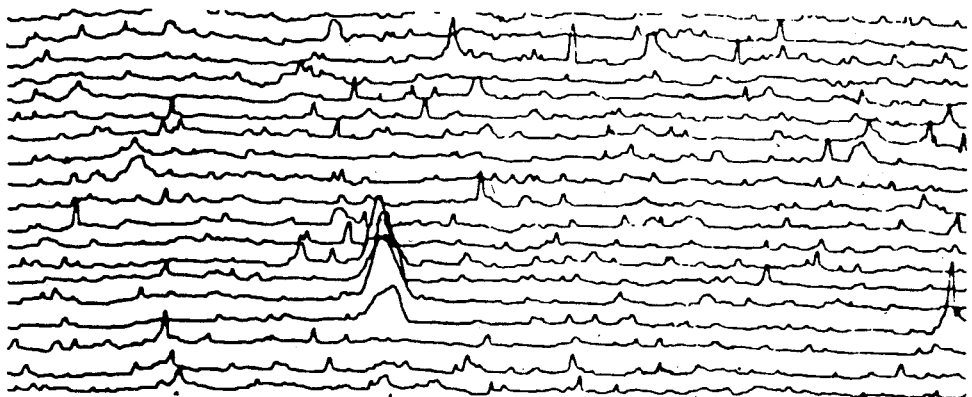
FIG. 5 is a diagram of the surface roughness of another biaxially oriented polyester film surface of the prior art.
Figure 6:
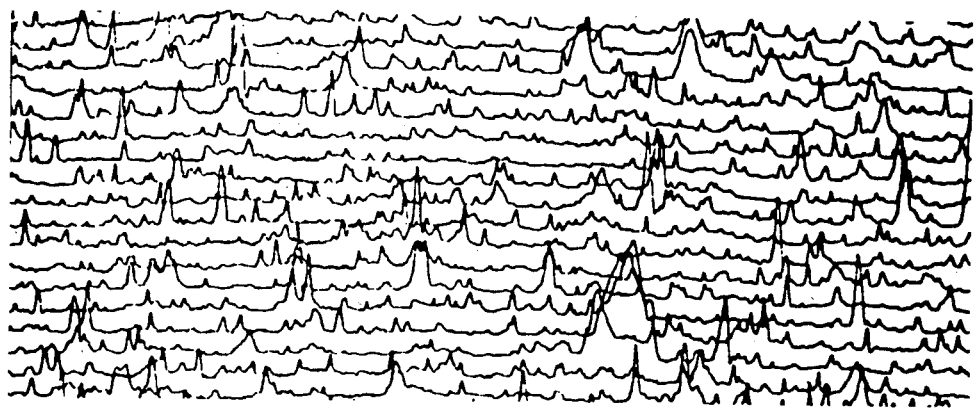
FIG. 6 is a diagram of the surface roughness of another biaxially oriented polyester film surface of the prior art.

FIG. 2 shows the $R_z$ distribution in biaxially stretched polyethylene terephthalate film and thus also the uniformity of surfaces, compared to the prior art.

FIGS. 3 to 6 depict Gould recordings of biaxially stretched polyethylene terephthalate films according to the state of the art (U.S. Pat. No. 4,32,207). These diagrams were recorded by means of an instrument which mechanically scans the surface of the film to be examined, producing electrical pulses in the process, which are passed on to an amplifier and from there to a recorder. Amplification was adjusted in such a way that 1 cm in the direction of the curves proceeding from left to right corresponds to a measurement length of 100 μm on the the film surface; vertically, in the direction of the distance between the curves which are arranged one beneath the other, 1 cm in the figures similarly corresponds to a measurement length of 100 μm on the film surface; in the direction normal to the plane of the recording, i.e. in the direction of the elevations shown, 1 cm in the figures corresponds to an elevation of 0.5 μm on the measured film surface. The figures clearly show the irregularities on the surfaces, which are caused by extremely protruding peaks (oversize grain).

Figure 7:
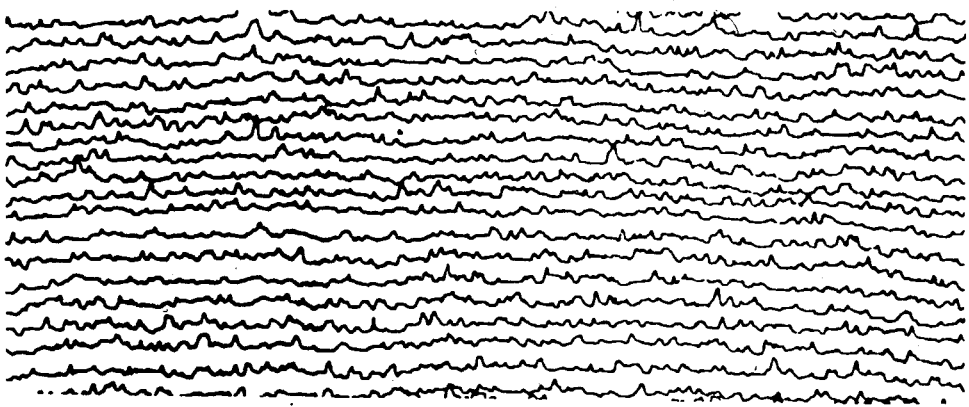
FIG. 7 is a diagram of the surface roughness of a biaxially oriented polyester film of the present invention.

FIG. 7 shows the particular uniformity of a biaxially stretched polyethylene terephthalate film produced from a raw material of the present invention. Amplification is identical to that chosen in the measurements of FIGS. 3 to 6.

Figure 8:
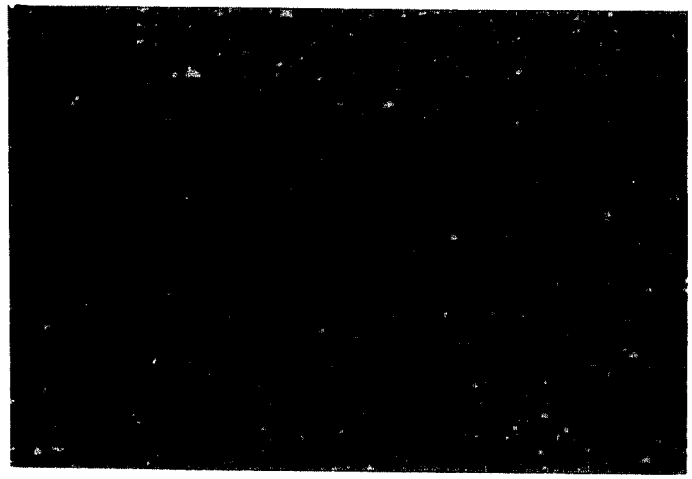
FIG. 8 is a photograph of the surface of a biaxially oriented polyester film of the prior art.

FIG. 8 is a copy of a photograph showing the surface of a biaxially stretched polyethylene terephthalate film produced from a raw material containing pulverized polymer particles according to the state of the art (U.S. Pat. No. 4,320,207). In the photograph, the coarse peaks of the pigment are clearly recognizable.

Figure 9:
FIG. 9 is a photograph of the surface of a biaxially oriented polyester of the present invention.

FIG. 9 is a copy of a photograph showing the surface of a biaxially stretched polyethlyene terephthalate film produced from a waw material of the present invention. In comparison to the film according to FIG. 8, this photograph displays the uniformity of the surface of the film of the invention, which is free of oversize grain.

While the examples recited above illustrate a polyester composition comprising polyethylene terephthalate, the present invention is not so limited since—as is explained herein—the particles prepared by emulsion polymerization can also be used in other polyesters.

We claim:

1. A composition comprising a polyester chemically modified with from 0.005 to 5.0 percent by weight, based upon the total weight of said composition, of cross-linked polymer particles covalently bonded to and substantially homogeneously distributed throughout said polyester, said particles having a grain size distribution of from 0.02 to 2.0 μm, wherein the quotient of the weight average particle diameter and the number average particle diameter is less than 1.1, with the following provisos:
   (1) that said particles comprise the reaction products of
   (a) at least one polyethylenically unsaturated comonomer selected from the group consisting of diallyl phthalate, divinyl benzene, butanediol dimethacrylate, ethanediol dimethacrylate, hexanediol dimethacrylate, ethanediol diacrylate, butanediol diacrylate, hexanediol diacrylate, pentaerythritol triacrylate, trimethylolpropane triacrylate, tetraethyleneglycol diacrylate, tripropyleneglycol diacrylate, and trimethylolpropane trimethacrylate, and
   (b) at least one monoolefinically unsaturated comonomer selected from the group consisting of methyl methacrylate, butyl acrylate, 2-ethylhexyl acrylate, ethyl acrylate, maleic acid dialkyl ester, styrene, vinyl toluene, acrylonitrile, methacrylonitrile, methacrylic acid, acrylic acid, maleic acid, crotonic acid, itaconic acid, hydroxyethyl methacrylate, hydroxyethyl acrylate, hydroxypropyl methacrylate, hydroxypropyl acrylate, N-methylol methacrylamide, glycidyl methacrylate, allylglycidyl ether, and acrylamidopropane sulfonic acid,
   (2) that said crosslinked polymer particles are emulsion polymerized from said polyethylenically unsaturated comonomer and said monoolefinically unsaturated comonomer using from 0.01 to 10 percent by weight, based upon the total weight of said comonomers, of a free radical generating initiator which is at least partly soluble in water; and
   (3) that said crosslinked particles are polymerized in the absence of emulsifiers and protective colloids.

2. The composition of claim 1 wherein the quotient of the weight average particle diameter and the number average particle diameter is less than 1.05.

3. The composition of claim 1 wherein said polyester comprises polyethylene terephthalate.

4. The composition of claim 1 wherein said polyethylenically unsaturated comonomer is divinyl benzene, and said monoolefinically unsaturated comonomer is selected from the group consisting of methyl methacrylate, butyl acrylate, methacrylic acid, acrylic acid, styrene, acrylonitrile, and mixtures thereof.

5. The composition of claim 4 wherein said monoolefinically unsaturated comonomer comprises, at least in part, at least one compound selected from the group consisting of hydroxyethyl methacrylate, acrylic acid, and methacrylic acid.

6. A process for the manufacture of chemically modified polyester comprising
   (a) reacting at least one polyethylenically unsaturated cross-linking comonomer and at least one monoolefinically unsaturated comonomer such that a crosslinked polymer particle is produced having
      a grain size distribution of from 0.02 to 2.0 μm, wherein the quotient of the weight average particle diameter and the number average particle diameter is less than 1.1,
   (b) introducing said cross-linked polymer particles into a polyester synthesis such that said particles are chemically incorporated into the polyester, in a substantially homogeneous distribution, with the following provisos:
   (1) that said polyethylenically unsaturated comonomer is selected from the group consisting of diallyl phthalate, divinyl benzene, butanediol dimethacrylate, ethanediol dimethacrylate, hexanediol methacrylate, ethanediol diacrylate, butanediol diacrylate, hexanediol diacrylate, pentaerythritol triacrylate, trimethylolpropane triacrylate, tetraethyleneglycol diacrylate, tripropyleneglycol diacrylate, and trimethylolpropane trimethacrylate, and
   (2) that said monoolefinically unsaturated comonomer is selected from the group consisting of methyl methacrylate, butyl acrylate, 2-ethylhexyl acrylate, ethyl acrylate, maleic acid dialkyl ester, styrene, vinyl toluene, acrylonitrile, methacrylonitrile, methacrylic acid, acrylic acid, maleic acid, crotonic acid, itaconic acid, hydroxyethyl methacrylate, hydroxyethyl acrylate, hydroxypropyl methacrylate, hydroxypropyl acrylate, N-methylol methacrylamide, glycidyl methacrylate, allylglycidyl ether, and acrylamidopropane sulfonic acid,
   (3) that said crosslinked polymer particles are emulsion polymerized from said polyethylenically unsaturated comonomer and said monoolefinically unsaturated comonomer using from 0.01 to 10 percent by weight, based upon the total weight of said comonomers, of a free-radical generating initiator which is at least partly soluble in water, and (4) that said crosslinked particles are polymerized in the absence of emulsifiers and protective colloids.

7. The process of claim 6 wherein said polyester synthesis employs direct esterification and said polymer particles are introduced at the beginning of the esterification reaction.

8. The process of claim 6 wherein said polyester synthesis employs transesterification and said polymer particles are introduced at the beginning of the transesterification reaction.

9. The process of claim 6 wherein said polyethylenically unsatureted comonomer is divinyl benzene, and said monoolefically unsaturated comonomer is selected from the group consisting of methyl methacrylate, butyl acrylate, methacrylic acid, acrylic acid, styrene, acrylonitrile, and mixtures thereof.

10. The process of claim 9 wherein said monoolefinically unsaturated comonomer comprises, at least in part, at least one compound selected from the group consisting of hydroxymethyl methacrylate, acrylic acid, and methacrylic acid.

11. A film comprising the compostion of claim 1.

12. The film of claim 11 wherein said film is oriented.

13. The film of claim 12 wherein said film is biaxailly oriented.

14. The film of claim 11 wherein said film is heat set.

15. A composite film wherein one layer of said film comprises the composition of claim 1.

16. The film of claim 15 wherein one outer layer contains a pigment and the second outer layer is unpigmented.

17. A fiber comprising the composition of claim 1.

* * * * *